(12) United States Patent
Walsh et al.

(10) Patent No.: US 11,794,425 B2
(45) Date of Patent: Oct. 24, 2023

(54) RESIN BARRIER DEVICE, GASKET AND METHOD FOR INFUSING A PREFORM

(71) Applicant: SHORT BROTHERS PLC, Belfast (GB)

(72) Inventors: Oran Walsh, Donaghadee (GB); Jonathan Thomas Graham, Newtonards (GB)

(73) Assignee: SHORT BROTHERS PLC, Belfast (GB)

( * ) Notice: Subject to any disclaimer, the term of this patent is extended or adjusted under 35 U.S.C. 154(b) by 0 days.

(21) Appl. No.: 17/894,601

(22) Filed: Aug. 24, 2022

(65) Prior Publication Data

US 2023/0046356 A1 Feb. 16, 2023

Related U.S. Application Data

(62) Division of application No. 16/769,715, filed as application No. PCT/GB2018/053509 on Dec. 4, 2018, now Pat. No. 11,498,292.

(30) Foreign Application Priority Data

Dec. 4, 2017 (GB) ..................................... 1720138

(51) Int. Cl.
| | | |
|---|---|---|
| *B29C 70/54* | (2006.01) | |
| *B01D 19/00* | (2006.01) | |
| *B01D 63/08* | (2006.01) | |
| *B29C 70/36* | (2006.01) | |
| *B29C 70/44* | (2006.01) | |
| *B29C 70/48* | (2006.01) | |

(52) U.S. Cl.
CPC .......... *B29C 70/54* (2013.01); *B01D 19/0031* (2013.01); *B01D 63/087* (2013.01); *B29C 70/36* (2013.01); *B29C 70/443* (2013.01); *B29C 70/48* (2013.01); *B29C 70/546* (2013.01); *B01D 2313/04* (2013.01)

(58) Field of Classification Search
CPC ....... B29C 70/36; B29C 70/443; B29C 70/48; B29C 70/546; B29C 33/10
See application file for complete search history.

(56) References Cited

U.S. PATENT DOCUMENTS

| | | | |
|---|---|---|---|
| 2,192,968 A | 3/1940 | Fieser | |
| 3,975,479 A * | 8/1976 | McClean | ................ B29B 15/10 264/102 |
| 4,111,807 A | 9/1978 | Boomus et al. | |

(Continued)

OTHER PUBLICATIONS

S.D. Eisendrath. U.S. Pat. No. 604,931. Issued May 31, 1898, 3 pages.

*Primary Examiner* — Matthew J Daniels
(74) *Attorney, Agent, or Firm* — HOVEY WILLIAMS LLP

(57) ABSTRACT

A resin barrier device for connection in a vacuum line, for use in resin infusion during composite manufacture, includes a housing having an inlet port for connection to a resin source and an outlet port for connection to a vacuum source. A flow path extends between the inlet and outlet ports. A gas-permeable membrane is disposed across the flow path to prevent resin from flowing to the vacuum pump. A gasket supports the membrane and is adapted to prevent resin leakage. A method of infusing a preform with a resin also is provided.

14 Claims, 6 Drawing Sheets

(56) References Cited

U.S. PATENT DOCUMENTS

| | | | |
|---|---|---|---|
| 4,159,954 A | | 7/1979 | Gangemi |
| 4,178,406 A | * | 12/1979 | Russell ................ B32B 5/02 |
| | | | 273/DIG. 7 |
| 4,529,419 A | | 7/1985 | Perl et al. |
| 5,624,556 A | | 4/1997 | Kutowy et al. |
| 7,147,818 B1 | * | 12/2006 | Rigas ................ B29C 70/443 |
| | | | 264/102 |
| 7,258,828 B2 | | 8/2007 | Fish |
| 9,868,237 B2 | | 1/2018 | Filsinger et al. |
| 10,213,970 B2 | | 2/2019 | Heim et al. |
| 10,252,479 B2 | | 4/2019 | Weinholdt et al. |
| 10,960,617 B2 | | 3/2021 | McKibbin |
| 2002/0020934 A1 | * | 2/2002 | Hinz ................ B29C 70/443 |
| | | | 264/102 |
| 2003/0011094 A1 | * | 1/2003 | Filsinger ............ B29C 70/548 |
| | | | 425/389 |
| 2004/0265406 A1 | | 12/2004 | Lorenz et al. |
| 2005/0023712 A1 | * | 2/2005 | Backhouse ......... B29C 70/546 |
| | | | 264/102 |
| 2005/0086916 A1 | * | 4/2005 | Caron ................ B29C 70/544 |
| | | | 55/382 |
| 2007/0132142 A1 | * | 6/2007 | Voegeli .............. B29C 70/443 |
| | | | 264/510 |
| 2017/0151732 A1 | * | 6/2017 | Weinholdt ............ B29C 70/48 |
| 2017/0341320 A1 | * | 11/2017 | McKibbin ........... B29C 70/443 |
| 2018/0072005 A1 | * | 3/2018 | Gu .................... B29C 70/546 |

* cited by examiner

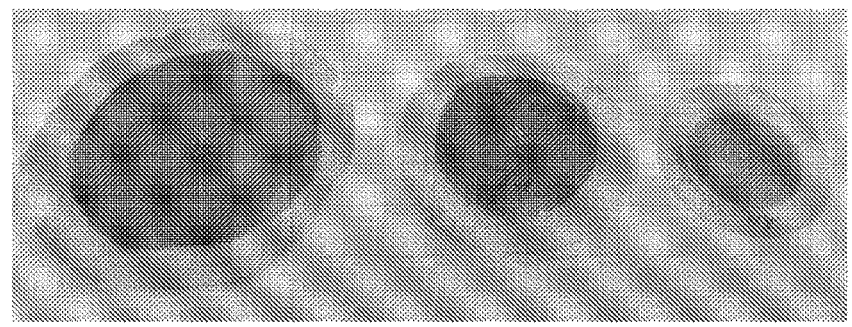
Fig. 6A
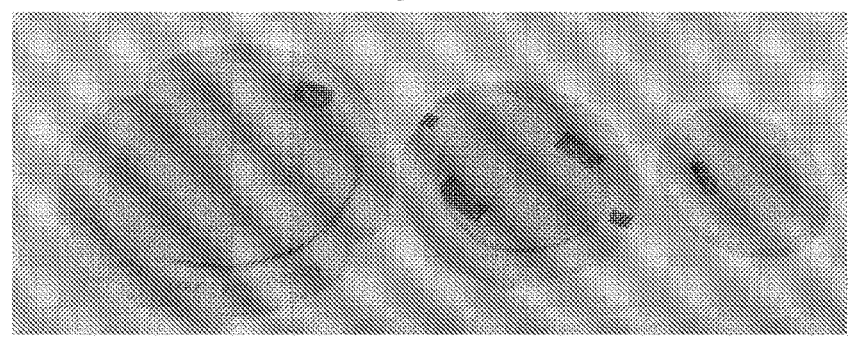
Fig. 6B
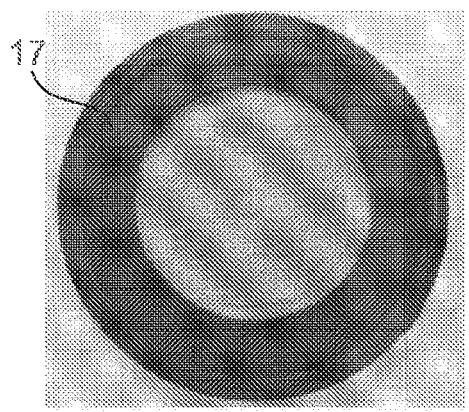 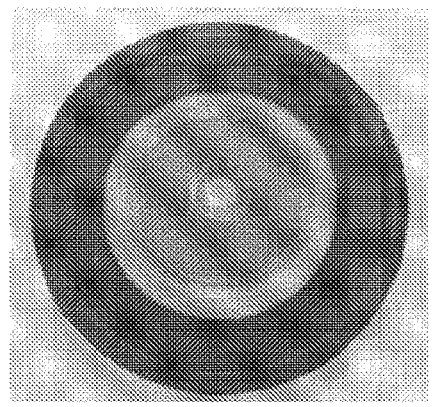
Fig. 7A          Fig. 7B

RESIN BARRIER DEVICE, GASKET AND METHOD FOR INFUSING A PREFORM

CROSS-REFERENCE TO RELATED APPLICATIONS

This application is a divisional of and claims priority to U.S. application Ser. No. 16/769,715 filed on Jun. 4, 2020 and entitled "Resin Barrier Device, Gasket and Method for Infusing a Preform," which is incorporated by reference herein in its entirety. Furthermore, U.S. application Ser. No. 16/769,715 claims priority from PCT/GB18/53509 filed Dec. 4, 2018, which in turn claims priority from GB application No. 1720138.5 filed Dec. 4, 2017, the entire contents of each of these parent applications incorporated by reference herein.

FIELD OF THE INVENTION

The invention relates to the field of composite manufacture, in particular to methods and apparatus for use in resin transfer infusion composite articles.

BACKGROUND TO THE INVENTION

Composite materials are formed from a reinforcement component and a matrix component, which combine to provide the composite material with properties that are an improvement over either of the components alone.

The reinforcement component is typically a fabric material. For example, carbon fibre fabric is formed by carbonizing a synthetic polymer fabric material and may be provided in the form of woven fabric, non-woven fabric or may consist of unidirectional fibres. Similar composites may be formed using alternative fabrics, such as fibreglass or synthetic polymers (e.g. aramid), or combinations of fabrics.

Multiple plies of fabric are laid up on a mould and the dry "pre-form" is then impregnated with a resin, using a resin infusion method (such as resin transfer moulding, vacuum assisted resin transfer infusion), and the resin then cures to form a reinforcing polymer matrix. For example, in resin transfer infusion (RTI), the dry preform is sealed in a cavity defined between a flexible vacuum "foil" (sometimes called a vacuum bag) and a mould surface. The cavity is then evacuated and liquid resin flowed into the volume under the action of the resulting pressure differential.

In order to ensure that the composite component is of acceptable quality, it is essential that all air and volatiles are removed from the preform before and during the infusion process.

The applied vacuum is therefore maintained throughout the infusion process, so that the preform is as evenly infused as possible and porosity defects are minimized.

During resin infusion, particularly when performed at elevated temperature or within an autoclave, resin must be prevented from flowing out of the cavity and into costly vacuum pumps.

It has been proposed, for example in US 201310069286 of Heim et al., to place a semi-permeable membrane within the vacuum cavity between the pre-form and the vacuum film, to which vacuum port(s) are installed. Particularly for complex or large components, it can be challenging to evenly apply the membrane, and folds or leaks can result in material "bridging" or other component imperfections. Whilst it is possible in principle to place a membrane over smaller regions of the preform to mitigate such issues, it can be challenging or impossible in practice to position these such that the resin "fronts" arrive at the vacuum ports at generally the same time, so that the entire preform is infused.

One approach is to place a "catch pot" between the vacuum cavity and the vacuum pump. Since multiple vacuum ports are needed for large components, this approach can be time consuming to set up, result in significant wastage of resin and vacuum tubing upstream of the catch pot. Additionally, in a closed cell such as an autoclave, it is not possible to control the resin outflow and hence the fibre volume fraction of the component.

Another approach is to place a resin trap or barrier device in each individual vacuum line, closer to the vacuum ports. While this can reduce tubing wastage, additional costs and time are associated with the set up and post infusion cleaning of each individual trap.

Resin traps themselves can also present problems. Since they are typically based on a float valve, they can malfunction if incorrectly orientated. When combined with elevated temperatures and pressures of an autoclave, float based resin barrier devices can also be prone to leakage around the float Resin traps and resin barrier devices can also result in undesirable flow restrictions.

There remains a need to address one or more of the foregoing problems encountered during resin transfer infusion.

SUMMARY OF THE INVENTION

In an aspect of the invention there is provided a resin barrier device for use in resin infusion of a composite preform, the resin barrier device comprising:
  a housing having an inlet port for connection to a resin source;
  an outlet port for connection to a vacuum source;
  a flow path extending between the inlet and outlet ports;
  wherein a portion of the flow path has an increased flow area that is larger than the flow area of either the inlet port or the outlet port;
  and
  a gas-permeable membrane across the increased flow area portion of the flow path.

The flow pathway may extend along an axis through the housing, said housing being symmetrically disposed around the axis.

The resin barrier device is of particular utility in resin transfer infusion manufacture of composite components. The resin barrier device can be placed in a vacuum line extending from a resin source, such as a vacuum cavity containing a composite preform, or at any other convenient location.

The gas-permeable membrane enables gas to be pumped through the vacuum line, so as to evacuate the cavity and remove trapped air or evolved gas during infusion of the preform. Any resin flowing from the cavity and into the flow path of the resin barrier device is blocked by the membrane.

The membrane is positioned across the increased flow area portion of the flow area, and thus the flow area across the membrane is the increased flow area; so as to mitigate or eliminate any flow restriction imposed by the membrane.

Unlike conventional in-line resin traps, the resin barrier device functions regardless of its orientation. This facilitates placement of the device in a required location, such as close to the vacuum ports of a vacuum cavity, which may reduce wastage of tubing. The resin barrier device contains no moving parts and so provides for improved reliability.

By vacuum source we refer to an arrangement by which a reduced pressure is applied, for example by a vacuum pump or a chamber held at a reduced pressure.

By resin source we refer to a volume or conduit from which a resin, for example an epoxy resin for use in composite manufacture, may flow; in addition to other fluids such as air, solvent vapour and the like.

The housing may comprise separable first and second portions, to provide access to the membrane. Typically, the membrane is replaceable by separating the first and second portion of the housing.

Each of the separable housing portions may comprise a said port. For example, the first portion may comprise the inlet port and the second portion may comprise the outlet port.

The first and second portions may be secured together by any suitable means, for example they may be threaded together, or bolted together.

In some embodiments, the each of the first and second portions comprise a flange, by which they are secured to one another.

Conveniently, conventional fittings may be used, such as a tri-clover fitting.

Accordingly, the said flanges may have peripheral surfaces tapering apart from one another away from a peripheral edge. The resin barrier device may comprise a collar, in use disposed around the housing, the collar comprising an internal recess sized to partially receive the peripheral surfaces. The collar may be tightened around the housing (by way of a wing-nut or the like) so as to urge the tapered surfaces into the recess and thereby apply a clamping force between the first and second portions.

The housing may have any suitable shape or configuration but the flow pathway conveniently extends along an axis through the housing. The housing may be symmetrically disposed around the axis. The housing may for example be polygonal (e.g. square), or alternatively circularly symmetrical.

The resin barrier device may comprise a sealing arrangement between the first and second portions of the housing. The sealing arrangement may include one or more seals, formed for example from a resilient or elastomeric material (e.g. Viton™, Teflon™, a silicone material, or a polymeric material such as ethylene propylene or polyurethane).

At least a part of the increased flow area portion may extend through the sealing arrangement. The sealing arrangement may define a perimeter of the flow path along at least a part of the increased flow area portion of the flow path, on one or both sides of the membrane. The first and second housing portions may for example be spaced apart by the sealing arrangement, and at least a part of the increased flow area portion may extend through the sealing arrangement.

In some embodiments, all or substantially all of the perimeter of the increased flow area portion of the flow path is defined by the sealing arrangement.

In use, the sealing arrangement may be compressed between the first and second housing portions. Such compression may for example assist in sealing between the sealing arrangement and each of the housing portions and also around the periphery of the membrane.

The membrane may in some embodiment be received in or supported in part by the sealing arrangement.

The sealing arrangement may comprise one or more O-rings and/or one or more gaskets.

The sealing arrangement may comprise a gasket comprising:
an outer flange portion extending around the periphery of the gasket; and
first and second inner flange portions extending inwardly from the outer flange portion around the periphery of the gasket; and
a peripheral slot between the first and second inner flange portions for receiving a membrane.

In use, the membrane may be received in and supported around its periphery in the slot.

In another aspect, the invention extends to a gasket for use to support a gas-permeable membrane in a resin barrier device, the gasket comprising:
an outer flange portion extending around the periphery of the gasket; and
first and second inner flange portions extending inwardly from the outer flange portion around the periphery of the gasket; and
a peripheral slot between the first and second inner flange portions for receiving a membrane.

The gasket may comprise a membrane received in and supported around its periphery in the slot.

The gasket both supports the membrane around the periphery and seals between the first and second portions of the resin barrier device housing. In addition, in use, resin leakage outwardly around the periphery of the membrane is prevented.

The inner faces of the flange portions also provide a lip to assist in locating flow media or breather material against the membrane.

The gasket may further comprise a peripheral bead, around one or both faces of the outer flange portion. In some embodiments, the first and/or second portions of the housing comprise a channel corresponding to the/each bead. Accordingly, in uses the bead is received in the channel and provides for a convoluted interface between the seal and the housing to assist in sealing.

Each face of the gasket may comprise a single bead or more than one bead.

A sealant (e.g. a silicone or mastic sealant) or vacuum grease may be used alternatively or in addition to the sealing arrangement.

The term "membrane" refers to a sheet material or fabric that functions as a selective barrier. The gas-permeable membrane as disclosed herein is permeable to gas (air, solvent vapour and the like) but is impermeable to or greatly impedes passage of condensed phases, including resin.

The membrane may be a porous material or fabric.

The membrane may be a semi-permeable membrane.

The membrane may have one or more layers, of the same or of one or more different types of material. For example, the membrane may be an expanded polymeric membrane such as expanded polytetrafluoroethylene. The membrane may be a woven or nonwoven fabric of mesh material, such as a silk material. The skilled addressee will appreciate that the pore size or permeability of the membrane selected will depend on the viscosity of the resin used in a particular application. For example, for certain "out of autoclave" resins, simple ePTFE membranes with a large air flow rate capacity are acceptable, whereas more advanced/low air flow rate membranes (e.g. based on polymer foam materials) may be required for high temperature, very low viscosity resins such as might be used in autoclave applications.

The flow areas of the increased flow area portion of the flow path across membrane may be at least 3 times, or at least 5 times, at least 10 times or at least 20 times larger than the flow area any remaining portions of the flow path. For example, the increased flow area may be at least 3, 5, 10 or 20 times larger than the flow area of the inlet and outlet ports and/or an adjoining vacuum conduit, so as to reduce or eliminate any flow restriction that might be otherwise caused by the membrane. In some embodiments, the increased flow area may be around 30-100, or 40-90, or 50-80, or 60-70 times larger than any remaining portions of the flow path.

The flow area across the membrane may be selected depending on the particular application, but may conveniently be in the range of around 5-50 $cm^2$ or 5-40 $cm^2$, or 10-30 $cm^2$. In some embodiments, the flow area across the membrane is around 20 $cm^2$.

A length of the flow path may have an increased flow area immediately upstream and/or downstream (most typically both upstream and downstream) of the membrane. The said length may be of the order of 1 cm, 0.5 cm or 1-2 mm. That is to say, the housing may define a volume across the flow area one or both sides of the membrane. At least a part of all of the said length may be defined by the sealing arrangement.

In some embodiments, the resin barrier device may comprise a flow media or breather material between the housing and the membrane, one or both sides of the membrane. The flow media or breather material may be downstream of the membrane. The flow media or breather material may be upstream of the membrane. In some embodiments, the resin barrier device may comprise a breather material downstream of the membrane and a flow media upstream of the membrane.

Flow media and breather material provide high permeability layers to assist the flow of resin and air, respectively. It will be appreciated that a given type of material may be capable of function both as a flow media or a breather material.

The resin barrier device may comprise any suitable flow media and/or breather material, for example an open mesh material such as a coarse fabric material, e.g. a polyester fabric. Flow media upstream of the membrane may assist in evenly distributing resin, and prolonging the working life of the membrane. Breather material downstream of the membrane may provide additional structural support to the membrane, as discussed below. The flow media/breather material may be separate from the membrane, or may be integral with the membrane. For example, the resin barrier device may comprise a membrane laminate, comprising a membrane having a flow media and/or breather material adhered thereto.

The membrane may be supported over at least a part of its surface area.

For example, the membrane may be supported around some or all of its periphery, between the first and second portions of the housing, optionally with a gasket or seal as described herein.

The membrane may be supported, in use, across at least a part of the membrane across the flow path. In particular, on the downstream side (i.e. the side closest to the outlet port) this may help resist deformation or rupture of the membrane in use.

The membrane may be supported directly, or indirectly, by the housing.

The flow media or breather material may extend between the membrane and the housing, across at least a part of the increased flow area. Accordingly the breather material (or flow media) may in use contact both the membrane and the housing and thereby provide support to the membrane.

The first and/or second portion of the housing may comprise an embossed or engraved flow pattern. In use, the flow pattern may be against the at least the downstream face of the membrane (and in some embodiments, only on the downstream face). The membrane may in this way be supported directly by the housing and the flow pathway be defined between the membrane and the flow pattern. The flow pattern may in some embodiments eliminate the need for a breather material/flow media downstream (and/or in some embodiments upstream) of the membrane.

The flow pattern and membrane may define a plurality of channels extending across or around the membrane surface and communicating with the outlet and/or inlet port. For example, the channels may be arranged in a "spider web" pattern around the outlet port.

The flow pattern may comprise an array of ridges or protrusions (e.g. pegs) to provide lines or points of support to the membrane.

The flow pattern may be cast or moulded, or may be etched or machined from the respective housing portion.

The inlet and outlet ports may be any suitable configuration for connecting to a conduit. The inlet and outlet ports may be adapted for connection to a flexible conduit (such as conduits or hoses used in out of autoclave methods), or may be adapted for connection a rigid conduit, such a copper tubing or the like (as used in autoclave composite manufacturing).

For example, a said port may comprise a barb fitting, or a threaded fitting.

A said port may comprise a support tube, a collet and a threadable or slideable collar for compressing an end of a conduit between the collet and support tube. Alternatively, a said port may be adapted to connect a conduit using a compressible (e.g. brass) olive and collar.

An inlet or outlet port may comprise a quick-release fitting such as a fitting comprising a sliding collar as described above, and as known in the art.

An inlet or outlet port may comprise a tri-clover fitting.

A conduit may be connected to the inlet and/or outlet port. A conduit may extend between the outlet port and a vacuum source. A conduit may extend between the inlet port and a resin source, such as the vacuum cavity formed during composite manufacture.

The cavity may be defined between a vacuum foil and a mould, or may be defined between two mould surfaces. The mould or moulds forming the cavity may be within an autoclave, or may be for use in out of autoclave composite manufacturing methods.

The housing may be formed from any suitable material. For example, the housing may be formed from a plastics material, or a metal material. The housing may be cast or machined. The housing may be injection moulded or 3d printed.

The first portion of the housing may be specifically adapted to be upstream of the membrane in use. The first portion and/or second portion of the housing may comprise a tapered bore (increasing in flow area towards the membrane or away from the membrane) to allow easy removal of the cured resin.

The housing may comprise unique features (such as external markings) to aid upstream/downstream identification.

The membrane may also be provided with markings on one or both sides, to aid upstream/downstream identification.

In another aspect, the invention extends to a method of infusing a composite preform with a resin, comprising:

applying a reduced pressure to a vacuum cavity comprising the preform, using a vacuum source; and
whilst the reduced pressure is applied:
flowing resin into the vacuum cavity from a resin source;
flowing resin out of the vacuum cavity and along a flow path towards the vacuum source;
flowing the resin into a portion of the flow path between the vacuum cavity and the vacuum source, having an increased flow area; and
blocking resin flow along the flow path using a gas-permeable membrane disposed across the increased flow area portion of the flow path.

The method may comprise flowing resin into the vacuum cavity through one or more inlets.

The method may comprise flowing resin out of the vacuum cavity through an outlet to a vacuum conduit, or more typically two or more, or a plurality of outlets and vacuum conduits. A plurality of vacuum conduits may communicate with a common vacuum source.

Each of the plurality of vacuum conduits may be associated with gas permeable membrane. For example, a resin barrier device comprising a gas-permeable membrane may be connected in line with each said vacuum conduit.

The method may comprise flowing resin out of the vacuum cavity along a vacuum conduit or a plurality of vacuum conduits, and blocking resin flowing along the or each vacuum conduit using a resin barrier device as disclosed herein.

The method may comprise blocking resin flow along the flow path close to the vacuum chamber. For example, the gas permeable membrane may be disposed across the flow path at a location of a vacuum conduit close to or adjacent to the vacuum cavity. For example, to reduce conduit wastage, the resin barrier devices may be installed a matter of between around 2 to 50 cm, or 2-25 cm or around 3-15 cm or around 5 or 10 cm from the vacuum cavity. It will be understood that the geometry of the vacuum cavity may dictate the orientation of the resin barrier device so located, and may result in one or more resin barrier devices being inverted or on one side.

For example, in some embodiments, one or more vacuum ports may extend from a vacuum cavity (e.g. may be distributed across a vacuum foil, or across a mould surface), and a resin barrier device as disclosed herein may be connected in line with each respective vacuum conduit proximal to each vacuum port.

The method may comprise flowing the resin into the vacuum cavity from a resin source using high temperatures and pressures. For example, the temperature may be above or around 100° C., 150° C., 170° C. or 190° C. and/or the pressure differential applied to the resin may be above or around 5 Bar, 6 Bar or 7 Bar.

The method may be conducted in an autoclave, which may be pressurised and or heated. The preform may be a carbon fibre preform.

The preform may alternatively or in addition comprise other fabrics, such as glass fibre, aramid, Kevlar™, nylon or the like. One or more further materials may be interwoven or mixed together in a single fabric used within one or more plies of the preform.

Further preferred and optional features of each aspect of the invention correspond to preferred and optional features of each other aspect of the invention.

DESCRIPTION OF THE DRAWINGS

Example embodiments will now be described with reference to the following figures in which:

FIG. 6A shows photographs of upstream faces of a membrane used in a resin barrier device during a resin transfer infusion process.

FIG. 6B shows photographs of downstream faces of a membrane used in a resin barrier device during a resin transfer infusion process.

FIG. 7A shows photographs of a downstream face of a membrane used in a resin barrier device during a resin transfer infusion process.

FIG. 7A shows photographs of an upstream face of a membrane used in a resin barrier device during a resin transfer infusion process.

DETAILED DESCRIPTION OF EXAMPLE EMBODIMENTS

Figure 1:
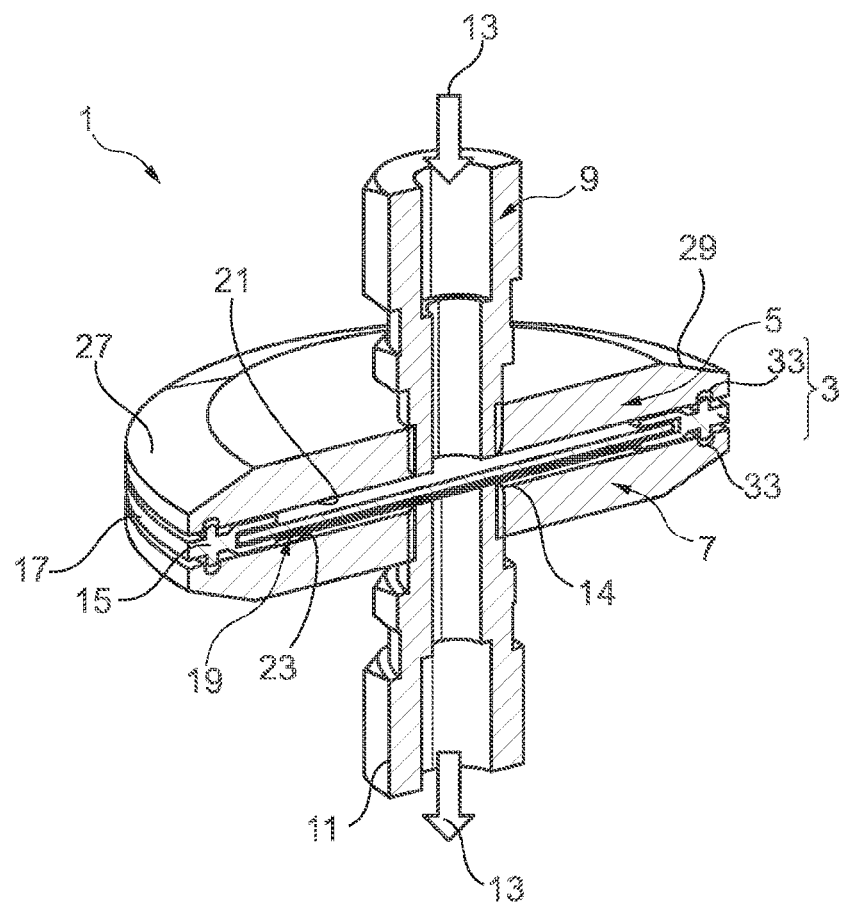
FIG. 1 shows a perspective cross sectional view of a resin barrier device.

FIG. 1 shows a cross sectional view of a resin barrier device 1. The resin barrier device has a housing 3 having separable first and second portion 5, 7. The housing has an inlet port 9 and an outlet port 11. In use these are connected to a resin source and a vacuum source, respectively.

A flow path 13 extends through the housing between the inlet port 9 and the outlet port 11. A gas-permeable membrane 15 is disposed across the flow path, within the housing 3.

The first portion 5 and the second portion 7 of the housing 3 are sealed together by a sealing 30 arrangement, in the form of a gasket 17, which is described in further detail below.

A portion of the flow path 13 has an increased flow area 14, in comparison to either the inlet or the outlet ports. The membrane 15 is across the increased flow area portion 14 of the flow path 13. In the embodiment shown, the flow area through the membrane is around 70 times 35 the flow area at the inlet port 9. In an embodiment shown, the flow area of inlet may be for example around 28 mm2, with and around 2000 mm2 at the membrane. The opposed faces 21, 23 of the respective first and second portions 5, 7 of the housing are spaced apart (in the embodiment shown, by the gasket 17), such that the flow path has an increased flow area around 1-2 mm either side of the membrane 15.

The volume within the housing 3 downstream of the membrane 15 (i.e. in the flow path 13 between the membrane and the second portion 7 of the housing) also includes a pad of breather material 19 (a nylon mesh). The breather material provides a degree of structural support to the membrane and in addition prevents the effective flow area of the membrane from being reduced by direct contact between the membrane and housing.

In alternative embodiments, the resin barrier device may further include a flow media upstream of the membrane, to promote event distribution of any resin flowing into the resin barrier device, in use.

Figure 2:
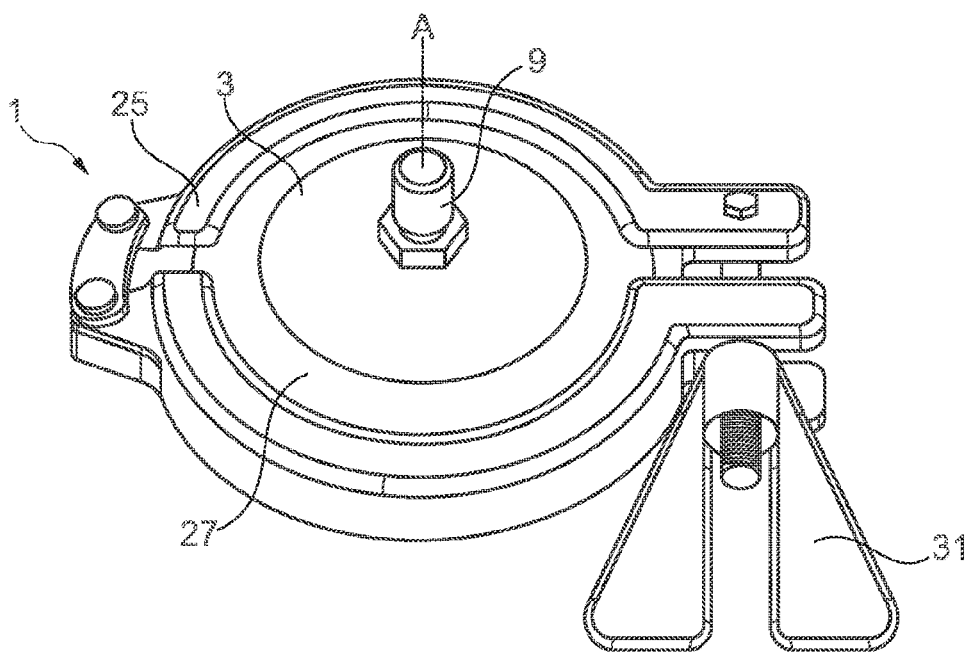
FIG. 2 shows the resin barrier device of FIG. 1 with a tri-clover clamp retaining the body portions together.

The first and second portions of the housing are secured together by a conventional tri-clover fitting, as shown in FIG. 2. An articulated clamp 25 surrounds the housing 3, and outer parts of the tapered surfaces 27, 29 of the housing portions fit within a slot (not visible in the figure) running around the inner circumference of the collar. A wing nut 31 is used to secure the collar 25 around the housing, so that radial compression of the collar around the housing is translated to compression along the axis A between the housing portions, as the collar rides up the opposed tapered surfaces 27, 29 of the housing.

To replace the membrane 15, the collar can be removed, so as to access the gasket 17.

Figure 3A:
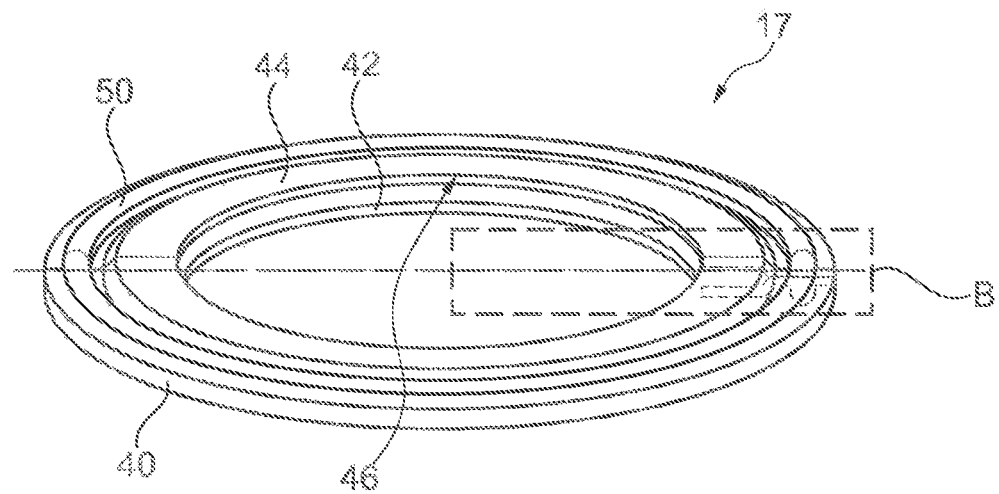
FIG. 3A shows a perspective view of a gasket for use in a resin barrier device.
Figure 3B:
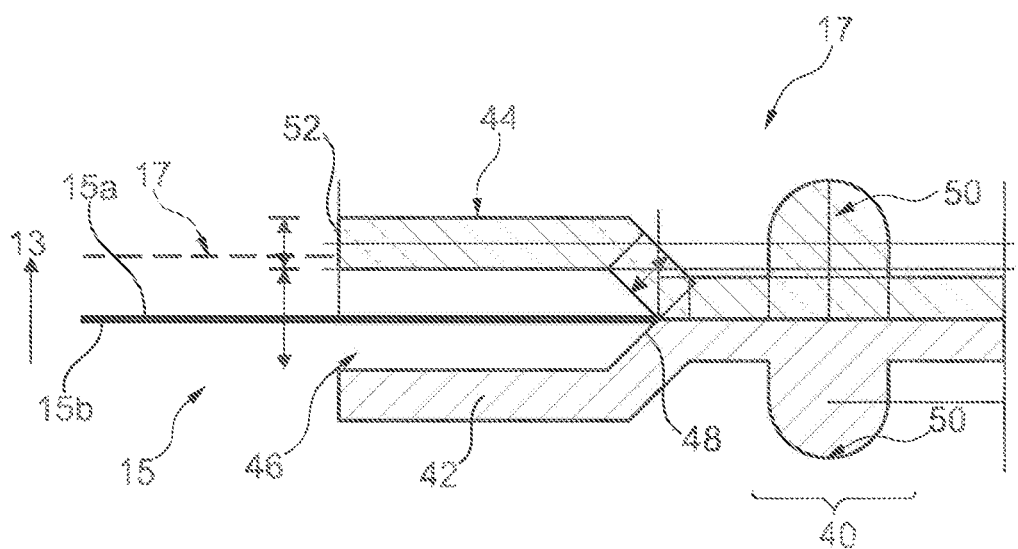
FIG. 3B shows an expanded cross sectional view of the gasket through plane B.

FIG. 3(a) shows a perspective view of the gasket 17. A schematic cross sectional view of the region B of the gasket is shown in FIG. 3(b). The gasket has an outer flange portion 40 and, extending inwardly therefrom, first and second inner flange portions 42, 44. Between the first and second inner flange portions 42, 44 is a peripheral slot 46.

In use, the membrane 15 is supported within the slot 46. It will be appreciated that FIG. 3(b) shows the configuration of the gasket 17 when in an uncompressed configuration, with any spacing between the first and second inner flange portions 42, 44 greatly exaggerated so that the features of the gasket can be clearly seen.

Also shown in FIG. 3(b) is the location of the disc of breather material 17, against the inner face 15a of the downstream inner flange portion of the membrane 15. The inner face 52 of the inner flange portion 44 and the exposed downstream face 15b of the membrane define a shallow recess for the breather material, which abuts the face 52 and is thereby prevented from slipping to one side and exposing the membrane as the gasket and membrane are assembled together in the housing.

In use, when pressure is applied between the separable portions of the housing, the inner flange portions 42, 44 are pressed against the membrane 15, such that the membrane is sealed around its periphery within the slot 46. This prevents resin from leaking outwardly of the edge 48 of the membrane 15.

The gasket 17 also has a raised bead 50 extending around the periphery of the outer flange portion 40, on both faces thereof. These rest in corresponding channels 33 in the opposing surfaces 21, 23 of the first and second portions 5, 7 of the housing 3 (see FIG. 1).

Accordingly, the interface between the gasket and the surfaces 21, 23 of the first and second portions of the housing are somewhat convoluted, to improve the integrity of the seal.

Alternatively, one or more conventional gaskets and/or O-rings may be used as a sealing arrangement.

Figure 4A:
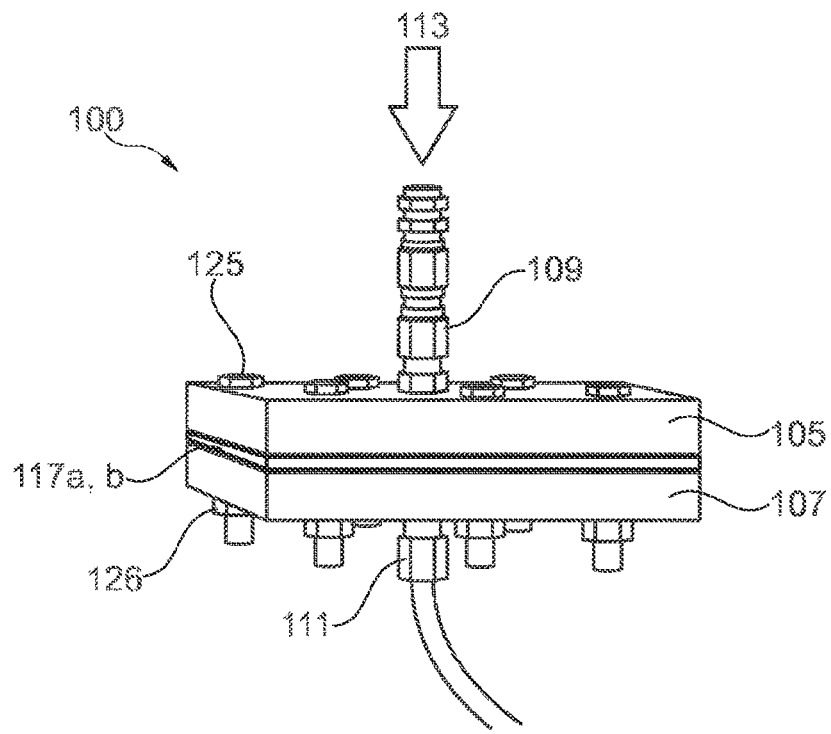
FIG. 4A shows a perspective view of an alternative embodiment of a resin barrier device.
Figure 4B:
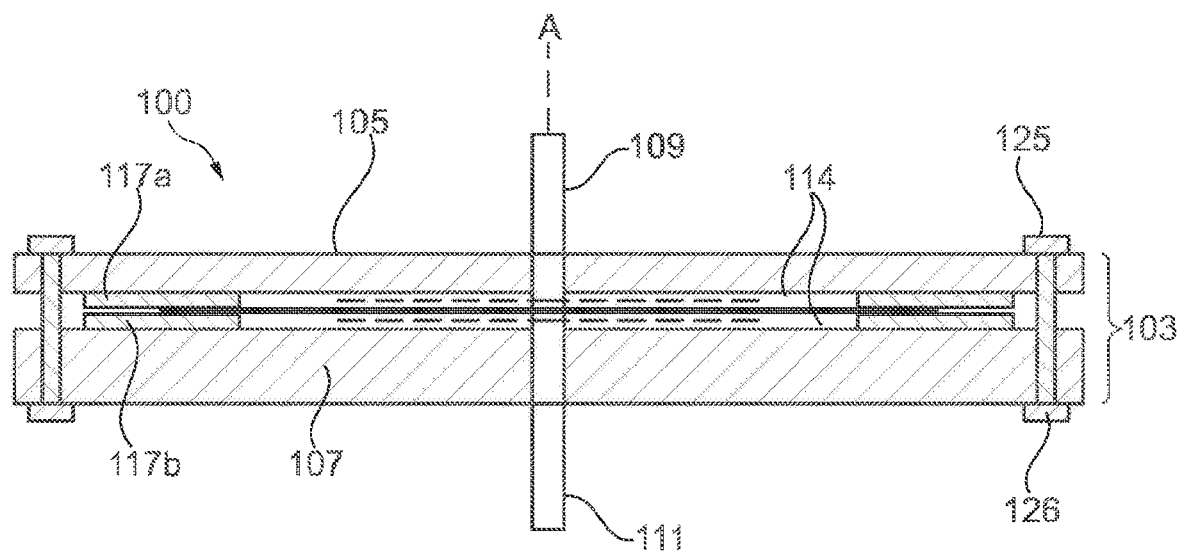
FIG. 4B shows a cross sectional view of the resin barrier device.

FIG. 4(a) shows a perspective view of an alternative embodiment of a resin barrier device 100. A schematic cross sectional view of the resin barrier device 100 is shown in FIG. 4(b). Features in common with the resin barrier device 1 are provided with like reference numerals, incremented by 100.

Unlike the circularily symmetric body 3 of the resin barrier device 1, resin barrier device 100 has a polygonal (square) body 103 disposed symmetrically around an axis A. The first portion 105 of the body 103 is attached to the second portion 107 of the body 103 by a series of bolts 125 and nuts 126 extending through the body 103 around its periphery. A gas permeable membrane 115 is located within the body in the flow path 113 that extends between the inlet port 109 and the outlet port 111.

The sealing arrangement between the first and second portions includes a gasket 117 a between the membrane 115 and the first body portion 105, and a further gasket 117 b between the membrane and the second body portion 107. Optionally, a silicone sealant may also be applied.

Figure 5A:
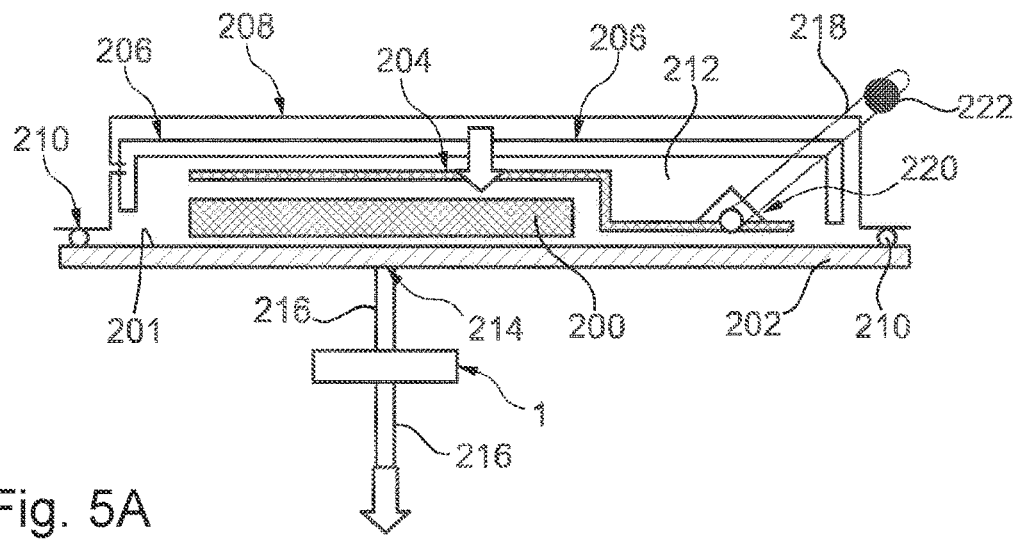
FIG. 5A is a schematic drawing of steps of a resin transfer infusion process, using a resin barrier device.

In the volume 116 between the separable portions of the body 103 (i.e. along the length of the increased flow area of the flow path), on the upstream side of the membrane 115 is a flow media 119 and on the downstream side there is a pad of breather material 119. FIG. 5(a) is a schematic illustration of apparatus used in a method of resin transfer infusion.

A dry carbon fibre preform 200 is laid up on a mould surface 201 of a tool 202. The preform is covered with layers of a flow media 204, a porous release fabric 206 (also known as a "peel ply") and then a vacuum foil (typically formed from a silicone material) or, in the embodiment shown, a mould tool 208. These layers are then sealed against the mould surface 201 of the tool 202 using a mastic sealant tape 210 and optionally O-rings, so as to define a vacuum cavity 212 between the tool and the mould tool 208. At least one outlet port 214 extends through the tool, and a vacuum conduit 216 is connected to a vacuum source, typically a vacuum pump (not shown).

A resin barrier device 1 as disclosed herein is connected in line with the vacuum conduit, close to the outlet 214. A close-up view of the resin barrier device 1 and vacuum line is shown in FIG. 5(c), with tri-clover fittings at the inlet and outlet ports. The resin barrier device 1 is positioned as close to the tool 202 as possible (around 5 to 10 cm—to allow a sufficient length of vacuum conduit 216 to make a gas-tight connection with both the outlet 214 and the inlet port 9 of the resin barrier device). This is made possible because the resin barrier device is capable of functioning in any orientation, including with the inlet port above the outlet port as shown.

An inlet conduit 218 extends from a resin source, typically a vessel containing a reservoir of resin (not shown) to an inlet nozzle 220 in the vacuum cavity. The inlet nozzle communicates with the flow media 204.

Various sealant and release layers, as known in the art, are omitted for clarity. It should also be understood that while a single outlet from the vacuum cavity is shown, in practice multiple outlets may be present.

With an inlet valve 222 in the inlet conduit 218 dosed, the vacuum pump is used to reduce the pressure in the vacuum cavity, in practice resulting in the contents of the vacuum cavity being compressed due to a resulting pressure differential between the vacuum cavity and its surroundings (typically at ambient pressure). The gas-permeable membrane in the resin barrier device 1 allows air to be pumped from the vacuum cavity in this way.

With the vacuum still applied to the vacuum conduit 216, the valve 222 is opened and resin from the resin source flows through the conduit 218 and the inlet nozzle 220 under the action of the pressure differential. The resin perfuses through the relatively high permeability flow media 204 and is drawn into the preform 200 and towards the outlet 214. During this process, residual air and evaporated solvent from the resin is pumped from the vacuum chamber and passes through the resin barrier device's gas-permeable membrane 15.

Optionally, the resin transfer infusion is conducted in an autoclave, and the pressure within the autoclave increased when the preform has been infused (and while the vacuum is still applied). This typically results in further excess resin flowing out of the vacuum cavity.

Figure 5B:
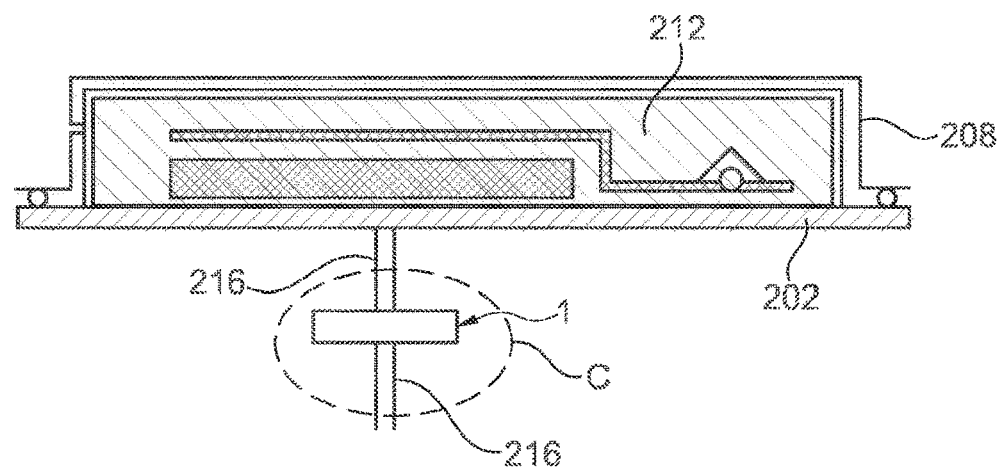
FIG. 5B is a schematic drawing of steps of a resin transfer infusion process, using a resin barrier device.
Figure 5C:
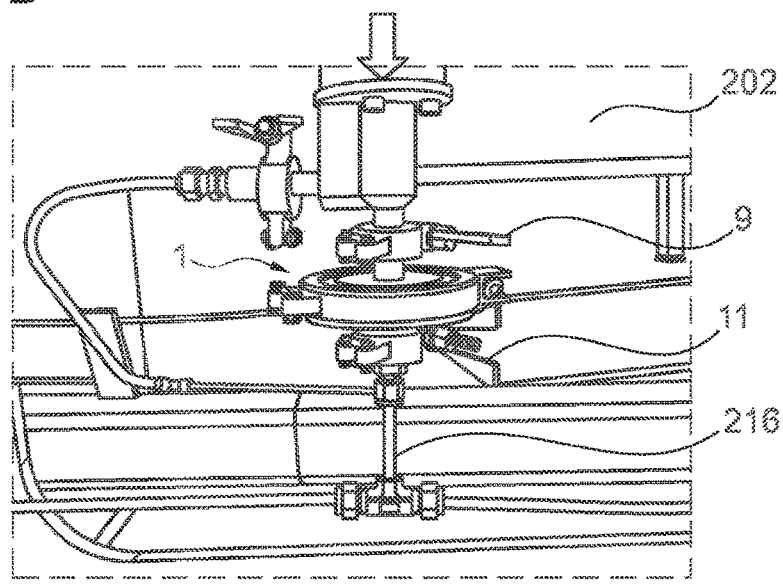
FIG. 5C is a close-up view of the resin barrier device.

As shown in FIG. 5(*b*), when the infusion is complete, the vacuum cavity 212 is filled with resin, and excess resin flows through the outlet 214 and along the vacuum conduit 216. The resin flows along the flow pathway in the resin barrier device 1 but, unlike the gaseous components, is blocked by the membrane. Resin is thereby prevented from flowing downstream of the resin barrier device and damaging the vacuum pump.

EXAMPLES

FIG. 6 shows (a) the upstream face and (b) the downstream face of a series of test membranes.

The membranes were used for a resin infusion process generally as described above with reference to FIG. 5. Initial pumping rate from the vacuum cavity through the resin barrier devices was between around 2-4 litres per minute.

Cycom 890 epoxy resin (Cycom is a trademark of Cytec Industries Inc.) was infused into a test preform at an elevated temperature, at which the resin viscosity was relatively low (ca. 200-250 cps).

Test were conducted using a sealing arrangement between the housing portions of hand-cut silicone gaskets (having a ShoreA hardness of 50-60) positioned around the periphery of hand-cut gas porous membranes, with approximate exposed membrane surface diameters of around 7.5 cm (3 inches), 6.3 cm (2.5 inches) and 5 cm (2 inches).

The membrane material used was a laminate construction including a two-layer microporous polymer foam and polyester textile outer faces, obtained from Trans-Texti® GmbH. Freilassing, Germany. The membrane has an airflow permeability of 2-4 lpm over 20 cm2 (determined using standard method EN ISO 9237), a maximum operating temperature of 190° C. and a resin barrier effectiveness to resins with viscosities as low as 10 cps.

On the downstream face of each membrane, was positioned a hand-cut disc of coarse weave breather material.

The sealing arrangements were removed following infusion and curing. As shown in the Figures, resin had collected on the upstream face of the membrane, with minimal or no resin permeating through the membrane. No resin was seen on the downstream face of the breather material.

FIGS. 7(*a*) and (*b*) show analogous results using a gasket 17, configured as described above in relation to FIGS. 1 and 3.

Figure 8:
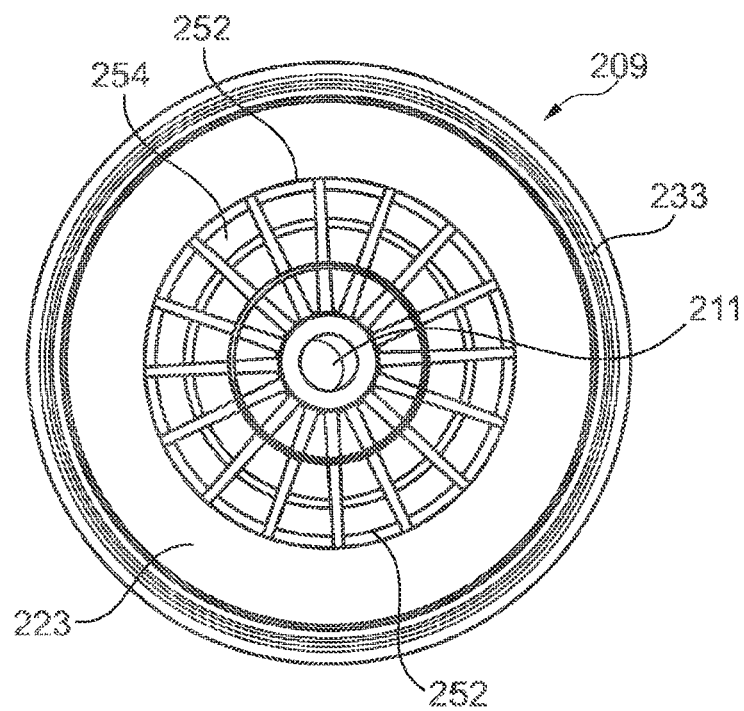
FIG. 8 shows an end-on view of an alternative body portion of a resin barrier device.

FIG. 8 shows an alternative embodiment of a second portion 209 of a resin barrier device housing. The figure shows the surface 223 which in use faces the first portion of the resin barrier device, and seals against the gasket 17.

The surface 223 includes a peripheral channel 233 which in use receives a bead 50. In addition, the surface is engraved with a flow pattern 252 (in this case in a spider web pattern radiating away from the outlet port 211).

The portion 209 is adapted for the resin barrier device to be used without a breather material between the membrane and the surface 223. In use, when the membrane contacts the surface 223 (when a pressure differential builds up across the membrane during initial evacuation and/or as resin builds up on the upstream face during infusion), the membrane surface and the flow pattern 252 together define channels providing fluid communication between the inlet and outlet ports, across the membrane surface. The non-engraved regions 254, between the engraved channels 256 of the flow pattern, provide support to the membrane, in use.

Figures 9A, 9B:
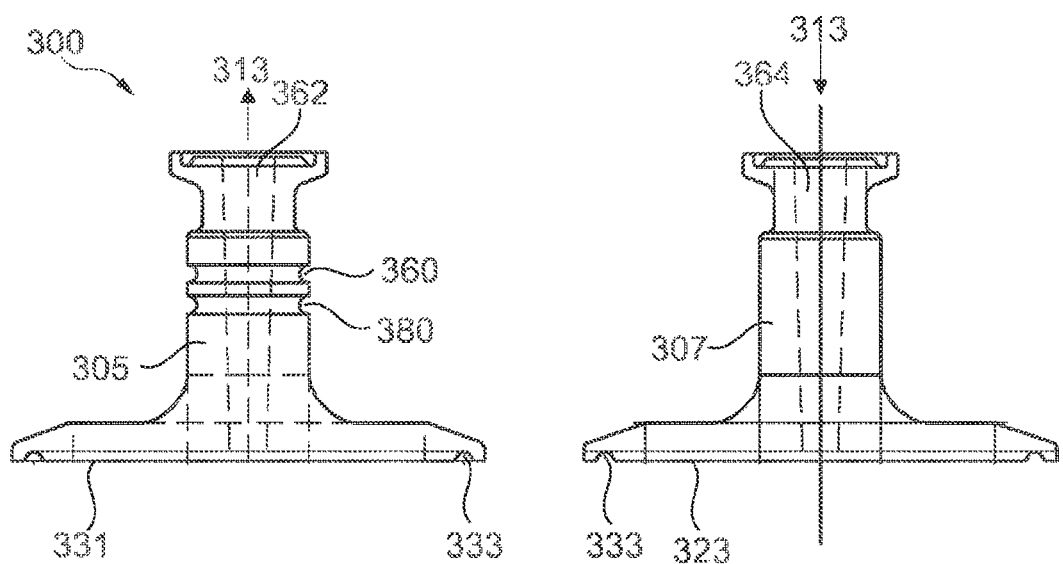
FIG. 9A shows a schematic cross sectional side view of housing body portions of a resin barrier device.
FIG. 9B shows a schematic cross sectional side view of housing body portions of a resin barrier device.

FIG. 9 shows cross sectional view of a further embodiment of (a) a first housing portion 305 and (b) a second housing portion 307 of a barrier device 300. Features in common with the barrier device 1 are provided with like reference numerals, incremented by 300. The first housing portion is adapted for placement downstream of the membrane in use, and comprises the outlet port 311. To assist with identification, the first housing portion is provided with indicia 360, in the form of grooves around the housing.

The second housing portion has an inlet port 309.

As described above in relation to the device 1, the first and second housing portions 305, 307 in use define a flow path 313 that extends through the housing between the inlet port 309 and the outlet port 311. A gas-permeable membrane as disclosed herein is disposed across the flow path.

The first and second housing portions 305, 307 and both the inlet and outlet pots 309, 311 in the embodiment shown provided with tri-clover fittings.

In use the membrane facing surfaces 321, 323 of the housing portions are separated by a gasket, such that the flow path has an increased flow area at the membrane, as described above.

Each housing portion has a tapered bore 362, 364. The bores are narrower close to the membrane facing surfaces 321, 323, so that the membrane facing surface provide maximal support to the membrane in use. The taper facilitates removal of "plugs" of cured or partially cured resin from the housing portions (in the direction of the inlet/outlet ports) after use.

Whilst exemplary embodiments have been described herein, these should not be construed as limiting to the modifications and variations possible within the scope of the invention as disclosed herein and recited in the appended claims.

The invention claimed is:

1. A method of infusing a composite preform with a resin, comprising:
    applying a reduced pressure to a vacuum cavity comprising the composite preform, using a vacuum source; and
    whilst the reduced pressure is applied:
        flowing resin into the vacuum cavity from a resin source;
        flowing the resin out of the vacuum cavity and along a flow path towards the vacuum source;
        flowing the resin into a portion of the flow path between the vacuum cavity and the vacuum source, having an increased flow area; and
        blocking the resin flow along the flow path using a gas-permeable membrane disposed across the increased flow area portion of the flow path, wherein a periphery of the increased flow area portion of the flow path is at least partially defined by a gasket made of a resilient or elastomeric material and having a peripheral slot between two flanges of the gasket, with the gas-permeable membrane secured in the peripheral slot by compression of the two flanges toward each other and against the gas-permeable membrane.

2. The method of claim 1, comprising flowing the resin out of the vacuum cavity through a vacuum conduit or a plurality of vacuum conduits.

3. The method of claim 2, blocking resin flowing along the vacuum conduit or each of the plurality of vacuum conduits using a resin barrier device.

4. The method of claim 3, wherein the resin barrier device comprises:
- a housing having an inlet port fluidly coupled with the resin source and an outlet port fluidly coupled with the vacuum source, wherein the flow path extends through the inlet port and the outlet port, and
- the gas-permeable membrane disposed across the increased flow area portion of the flow path, wherein the increased flow area portion of the flow path is located between the inlet port and the outlet port.

5. The method of claim 4, wherein the increased flow area portion has a cross-sectional area that is larger than a cross-sectional area of the flow path extending through either the inlet port or the outlet port.

6. The method of claim 5, wherein the housing further comprises separable first and second portions.

7. The method of claim 6, wherein the resin barrier device further comprises:
- the gasket positioned between the first and second portions of the housing, the gasket comprising: an outer flange portion extending around a periphery of the gasket, the two flanges comprising a first and second inner flange portions extending inwardly from the outer flange portion around the periphery of the gasket, and the peripheral slot between the first and second inner flange portions,
- wherein the gas-permeable membrane is received in and supported around a periphery thereof in the peripheral slot across the increased flow area portion of the flow path.

8. A method of infusing a composite preform with a resin, comprising:
- applying a reduced pressure to a vacuum cavity comprising the composite preform, using a vacuum source; and
- whilst the reduced pressure is applied:
  - flowing resin into the vacuum cavity from a resin source;
  - flowing the resin out of the vacuum cavity and along a flow path towards the vacuum source, wherein the flow path extends through a resin barrier device comprising a gas-permeable membrane;
  - flowing the resin into a portion of the flow path between the vacuum cavity and the vacuum source, having an increased flow area; and
  - blocking the resin flow along the flow path using the gas-permeable membrane disposed across the increased flow area portion of the flow path, wherein a periphery of the increased flow area portion of the flow path is at least partially defined by a gasket made of a resilient or elastomeric material and having a peripheral slot between two flanges of the gasket, with the gas-permeable membrane secured in the peripheral slot by compression of the two flanges toward each other and against the gas-permeable membrane.

9. The method of claim 8, wherein the resin barrier device comprises:
- a housing formed from separable first and second portions having an inlet port fluidly coupled with the resin source and an outlet port fluidly coupled with the vacuum source, wherein the flow path extends through the inlet port and the outlet port, and
- the gas-permeable membrane disposed across the increased flow area portion of the flow path, wherein the increased flow area portion of the flow path is located between the inlet port and the outlet port.

10. The method of claim 9, wherein the increased flow area portion has a cross-sectional area that is larger than a cross-sectional area of the flow path extending through either the inlet port or the outlet port.

11. The method of claim 10, wherein the resin barrier device further comprises:
- the gasket positioned between the first and second portions of the housing, the gasket comprising: an outer flange portion extending around a periphery of the gasket, the two flanges comprising first and second inner flange portions extending inwardly from the outer flange portion around the periphery of the gasket, and the peripheral slot between the first and second inner flange portions.

12. The method of claim 11, wherein the gas-permeable membrane is received in and supported around a periphery thereof in the peripheral slot across the increased flow area portion of the flow path.

13. The method of claim 12, wherein the gasket further comprises at least one continuous peripheral bead protruding outward from at least one of two faces of the outer flange portion, wherein the at least one peripheral bead is received in at least one channel of at least one of the separable first and second portions of the housing.

14. The method of claim 12, wherein a collar is disposed around the housing and is tightened, applying clamping force between the first and second portions and compressing the two flanges around the periphery of the membrane such that the membrane is thereby sealed around the periphery within the peripheral slot.

* * * * *